United States Patent [19]

Anderson et al.

[11] 4,078,193

[45] Mar. 7, 1978

[54] CAPSTAN SPEED CONTROL SYSTEM

[75] Inventors: David Robert Anderson, Murray; Vaughn Junior Jenkins, Bountiful, both of Utah

[73] Assignee: Sperry Rand Corporation, New York, N.Y.

[21] Appl. No.: 678,849

[22] Filed: Apr. 21, 1976

[51] Int. Cl.² .............................................. H02P 5/00
[52] U.S. Cl. .................................... 318/317; 318/400
[58] Field of Search ............... 318/400, 403, 404, 696, 318/317, 341, 162, 163, 271, 603, 604, 318, 397

[56] References Cited

U.S. PATENT DOCUMENTS

| | | | |
|---|---|---|---|
| 3,706,020 | 12/1972 | Klang | 318/400 |
| 3,859,581 | 1/1975 | Gardner | 318/603 |
| 3,906,319 | 9/1975 | Milligan | 318/318 |

Primary Examiner—Robert K. Schaefer
Assistant Examiner—Michael K. Mutter
Attorney, Agent, or Firm—Marshall M. Truex; John R. Flanagan

[57] ABSTRACT

A magnetic tape-transport system wherein the speed of a capstan used to transport magnetic tape past a read-write head is controlled utilizing digital techniques. A comparator is provided a first digital input indicative of desired speed and a second input from a counter which counts up or down until the count equals the first digital input. The counter output is converted to an analog voltage and applied to a summing junction point which also receives a voltage which is proportional to the instantaneous speed of the capstan drive motor. The voltage difference at the summing junction point is used to drive the capstan drive motor.

1 Claim, 3 Drawing Figures

CAPSTAN SPEED CONTROL SYSTEM

BACKGROUND OF THE INVENTION

As is well known, magnetic tape is a medium often used to provide input and receive output information from a computer. This is accomplished by use of a tape-transport system where the magnetic tape is transported between a supply reel and a take-up reel. These reels are of relatively high mass and inertia. Therefore, the tape-transport system utilizes a capstan to actually move the tape past a read-write head at writing and reading speeds. Just as importantly, the capstan which is low mass and inertia relative to the tape reels, is used to bring the tape up to read-write speed from a stopped condition or from read-write speed to stop. It is also used to reverse tape direction which normally entails bringing the tape to a stopped condition and driving it up to read-write speed in the opposite direction. The capstan is also used to move the tape at high speed, e.g., during rewind.

In most present-day, tape-transport systems the capstan is driven by its own motor, the precise control of which is critical to the efficient operation of the tape-transport system.

Precise control of the motor-driven capstan is necessary since it is important to waste as little tape as possible during the interval that the tape is being brought from stop to read-write speed, from read-write speed to stop or during a reverse tape direction interval when reading and/or writing does not occur. Thus, these intervals should occupy as little time and tape length as possible without sacrifice of accuracy of tape formatting or stability of the system.

Precise control of the motor-driven capstan is also important during speed up to read-write speed so that the speed of the tape will not overshoot tape read-write speed with the result of a period of instability during which the capstan motor hunts the normal running speed of the tape which further expands the interval during which reading or writing cannot take place or provides distortion in the data if reading or writing is permitted to occur.

As briefly mentioned above, accurate control of the motor-driven capstan is important to achieve precise tape formatting. In other words, accurate control of speed-up and speed-down intervals of the tape assures that all such intervals during which tape speed is changing fall within the inter-data gap, i.e., between data blocks on the tape. Precise control permits the intervals of tape-speed changes to be short with the result that the inter-data gaps can be correspondingly short. This, along with elimination of overshoot when tape speed reaches read-write speed, lessens the amount of tape used for inter-data gaps.

State-of-the-art tape-transport systems utilize ramp or sawtooth voltages to drive the capstan motor during speed-changing conditions. These ramp voltages may be combined with a voltage proportional to the velocity of the capstan motor before application to the motor-drive elements. However, accuracy of capstan motor control is determined by the accuracy of control of ramp-voltage generation.

The ramp voltage in present-day systems is generated by analog-integration techniques which, of course, implies the use of R-C networks to generate the sawtooth. As is well known, analog-integrator circuits are subject to drift and instability due to many factors such as temperature changes. Since intervals during which tape is brought from stop to running speed or from running speed to a stopped condition are ideally kept constant, use of analog circuitry with its inherent drift and instability presents a problem in which the time interval of the ramp voltage may vary. Such time-interval variation may be compensated by use of sophisticated circuitry by which the slope of the ramp voltage may be adjusted to cause the ramp voltage time interval to remain more or less constant. This, of course, is a trade-off and itself may exacerbate the running-speed overshoot problem already inherent in analog techniques.

The combination of the present invention contemplates the use of digital techniques to provide the ramp voltage instead of the analog integrator. Use of the digital arrangement of the present invention virtually eliminates the problems associated with conventional circuitry. Thus, the digital method of the present invention provides a ramp voltage whose time interval is kept constant without the necessity of varying the slope of the ramp. Further, with the use of the present invention, the speed of the capstan is brought exactly to desired running speed without overshoot.

Thus, the combination of present invention provides a capstan-motor control wherein the problems of drift and instability associated with present-day systems are eliminated. In addition, the present invention uses fewer components and provides a better system for a lower cost.

Specifically, the present invention contemplates a capstan-motor control in which a motor which drives the capstan provides a feedback voltage which is proportional to the instantaneous velocity of the motor to a summing junction by means of a tachometer generator connected to the motor. The summing junction also receives the ramp voltage provided by the digital circuitry. The motor which is connected to the summing junction is driven by any difference in voltage between the ramp and the tachometer voltage. The ramp voltage is provided essentially by a counter which counts up or down until it matches desired speed represented by a digitally-coded (e.g., binary) input to a digital comparator which also receives the counter's digitally-coded sum as an input. The output of the counter is continuously converted to an analog voltage before application to the summing junction. The counter counts up or down in synchronism with a clock-pulse source and provides a serrated-shaped or stepped ramp in which steps occur in synchronism with the period of the clock pulses. When the motor has attained the desired running speed or a desired stopped condition, the ramp voltage levels out to a constant or a zero voltage, respectively.

OBJECTS OF THE INVENTION

It is an object of the present invention to provide a capstan velocity control system utilizing digital techniques.

It is another object of the present invention to provide a capstan velocity control for use in a tape-transport system wherein a ramp voltage is provided having an unvarying time interval and a slope.

Another object of the present invention is to provide a capstan velocity control which eliminates the instability normally associated with conventional capstan velocity control systems.

A further object of the present invention is to provide a capstan velocity control system utilizing digital techniques as opposed to analog techniques which eliminates control-voltage instability utilizing fewer components and having a lower cost than systems utilizing analog techniques.

Yet another object of the present invention is to provide a capstan velocity control system wherein magnetic tape is brought from a stopped condition to desired speed without speed overshoot.

Still another object of the present invention is to provide a capstan velocity control system which conserves on the amount of magnetic tape used during speed-changing conditions due to elimination of control-voltage instability and speed overshoot.

Other objects and many of the attendant advantages of the present invention will become apparent upon reading the following description in conjunction with the accompanying drawings.

DESCRIPTION OF THE INVENTION

Figure 1:
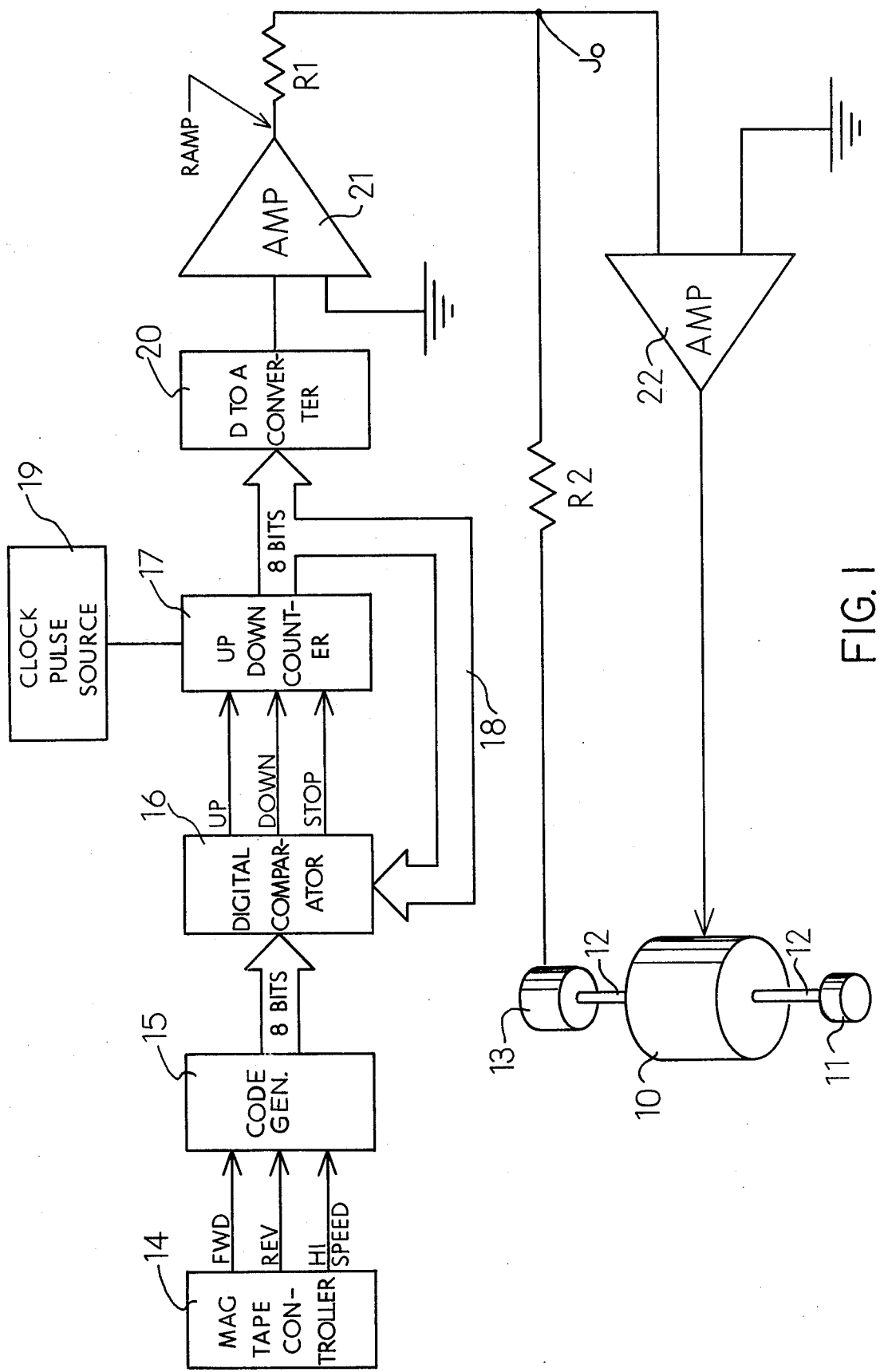
FIG. 1 illustrates a preferred embodiment of the present invention in block diagram form.

Referring now more particularly to FIG. 1, there is shown the capstan speed control system of the present invention. A motor 10 capable of being driven in either direction is connected to drive a capstan 11 via shaft 12. The capstan 11 may be a typical capstan used to drive magnetic tape past a read-write head of a tape-transport system at read-write speed, bring the tape from a stopped condition to read-write speed, bring the tape from read-write speed to a stopped condition or run the tape at a high speed, for example, as during rewind.

Figure 3:
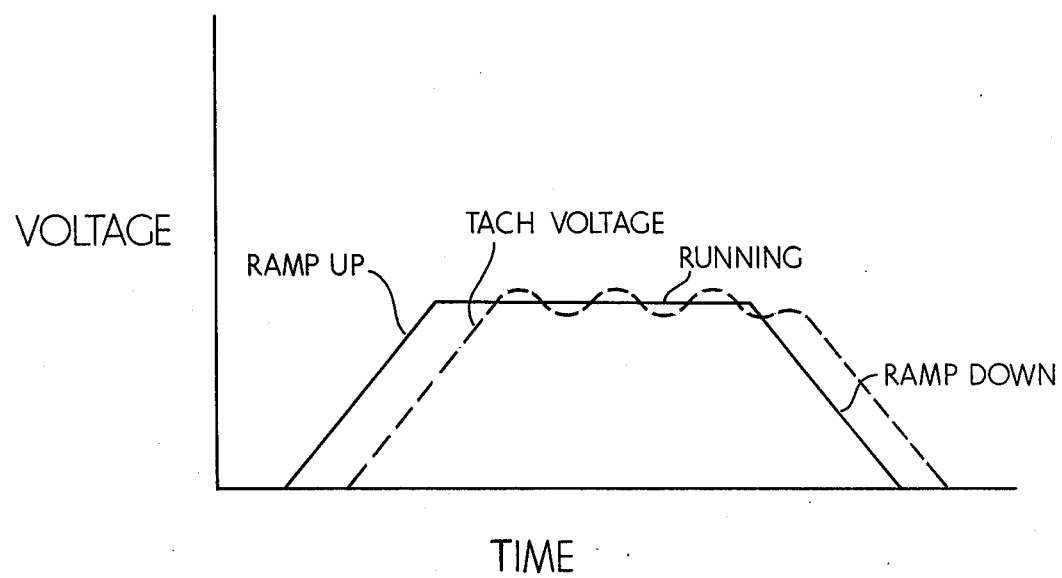
FIG. 3 shows a representation of the ramp voltage and the feedback voltage during ramp up of tape speed, normal running speed, and ramp down of tape speed.

A tachometer generator 13 is also connected to the motor 10 via shaft 12. The tachometer generator 13 generates a voltage proportional to the instantaneous velocity of the motor 10. This voltage represented by the dotted line in FIG. 3 is applied to summing junction $J_O$ through a resistor $R_2$.

A magnetic tape controller 14 provides commands to a code generator 15 indicative of desired speed and direction in which the magnetic tape is to be run. These commands are FORWARD, REVERSE and HIGHSPEED. The HIGHSPEED command may also be in the forward or reverse direction which is useful for rewind or high-speed purposes. The commands may be provided automatically, e.g., in accordance with a program stored in the magnetic tape controller 14 or elsewhere. Alternatively, the commands may be given manually, as for example, by an operator at a control panel. However, the manner and timing of command generation is not important to understanding the present invention; and it is sufficient to say that the code generator 15 is responsive to at least four discrete signals or energizations indicative of FORWARD, REVERSE and HIGHSPEED (forward and reverse).

In a preferred embodiment, the speed at which the capstan velocity control system moves tape is 75 inches per second or 75 ips., which is normal read-write speed in many tape-transport systems in use currently. The high-speed velocity is normally 150 ips. However, the tape can be driven at any desired speed dependent on the particular requirements of a tape-transport system.

The code generator 15 (consisting of three standard TTL 74153 dual four-line to one-line data-selector multiplexers with pre-wired inputs to ground and/or B+) may be a pre-wired, binary-code generator which provides an eight-bit binary code as an input to a digital comparator 16 in response to each command signal from the magnetic tape controller 14. Some code other than binary may be used, and the number of bits need not be eight as long as the digitally-coded number contains sufficient bits to provide direction and speed information.

The code generator 15 once wired to provide a digitally-coded output will provide only a total of four different discrete binary-coded outputs, one each for FORWARD, REVERSE, HIGHSPEED FORWARD and HIGHSPEED REVERSE. The code generator may be rewired to provide different outputs, e.g., for different speeds; but this is not usually done during normal operating conditions. For purposes of explanation, it is not necessary to discuss further the high-speed operation since this operation functions identically to the normal speed operation.

The coded output from the code generator 15, which is representative of desired speed and direction, is provided as an input to the digital comparator 16. Digital comparator 16 is connected to an up-down counter 17. The up-down counter 17 provides an input to digital comparator 16 via bus 18 and to digital-to-analog converter 20. Up-down counter 17 counts up, down, or stops count dependent on the results of the comparison made in digital comparator 16. The output from the up-down counter 17 is also an eight-bit binary code. When the output from the up-down counter 17 is less than the output from the code generator 15, the up-down counter 17 is caused to count up until the two inputs to the digital comparator 16 are equal. When this condition is met, the up-down counter 17 is caused to stop counting by a signal from the digital comparator 16.

When the output from the up-down counter 17 is greater than the output from the code generator 15, the up-down counter 17 is caused to count down until the two inputs to the digital comparator 16 are equal. When this condition is met, the up-down counter 17 is caused to stop counting.

When the up-down counter 17 stops counting, it holds the count until it receives a new command to count up or down. The digital output from the up-down counter 17 is continuously converted into an analog voltage by means of digital-to-analog converter 20 and applied to summing junction $J_O$ through amplifier 21 and resistor $R_1$. When the inputs to the digital comparator 16 are equal, i.e., when the count from the up-down counter 17 equals the binary-coded output (representative of desired speed) from the code generator 15, the output from the up-down counter 17 is representative of the speed at which it is desired to run the magnetic tape. Thus, at this time, the voltage from digital-to-analog converter 20 applied to the summing junction $J_O$ is proportional to desired running speed of the motor 10 and, therefore, the capstan 11.

A clock-pulse source 19 is connected to up-down counter 17, and the counter 17 counts in synchronism with the clock-pulse rate in a manner well known in the art.

The digital comparator 16 is composed of two standard TTL (Transistor-Transistor-Logic) digital integrated circuits. They are Fairchild T²L/MSI 9324 five-bit comparators.

The up-down counter 17 is composed of two standard TTL digital integrated circuits. They are 74193 synchronous four-bit, up-down counters available from many sources, i.e., Texas Instruments.

The clock-pulse source 19 is a standard digital integrated circuit oscillator/timer with Part Number 556 (dual timer) available from several sources, i.e., Signetics.

The digital-to-analog converter 20 is a monolithic linear integrated circuit which contains precision-sealed networks and solid-state switches and amplifiers for converting eight binary bits to an analog output current proportional to the digital output. The part number is DAC 08EZ and is available from Precision Monolithics, Inc.

Amplifier 21 is a standard linear integrated circuit operational amplifier. Amplifier 21 is a buffer amplifier for the digital-to-analog converter 20. Amplifier 21 converts the current output to a voltage for supplying to the input of the summing junction $J_0$.

$R_1$ and $R_2$ form an analog comparator which compares the precision ramp voltage (proportional to desired speed) with the tachometer voltage (proportional to actual speed). The scaled difference between these two signals represents the error signal which is amplified by error amplifier 22 preparatory to being applied to the power amplifier and motor driver.

It should be noted that the three input terminals to the code generator 15 are labeled FWD, REV and HI SPEED. These and the inputs to the up-down counter 17 labeled UP, DOWN and STOP are shown, thusly, for purposes of explanation; and it should be noted that the inputs to code generator 15 and up-down counter 17 could be provided on single conductors.

In normal operation the capstan speed control system of the present invention functions to cause the capstan 11 to bring the tape from a stopped condition to desired running speed or from running speed to a stopped condition. These are the two basic conditions of operation. Running speed may be high speed or read-write speed, and the tape may move in one of two directions. However, the system functions identically regardless of running speed or direction. Even when the tape is running in one direction and receives a reverse command, i.e., a command to run in the opposite direction, it is done in two steps, i.e., from running in one direction to stop and from stop up to running speed in the opposite direction.

The operation of the capstan speed control system is now discussed for these two conditions.

Figure 2:
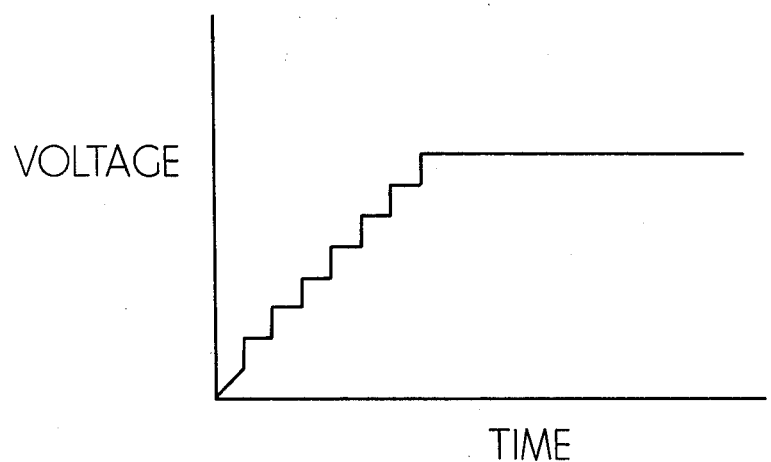
FIG. 2 shows a representation of the ramp voltage during a typical ramp-up condition.

When the motor 10 is stopped and the code generator 15 receives a command to run forward at a desired speed, the code generator 15 provides this information to the digital comparator 16 in the form of an eight-bit binary code. Since, at this time, the binary code from the up-down counter 17 fed into the digital comparator 16 is equivalent to zero speed, the counter 17 begins to count up in synchronism with the clock-pulse rate producing at the output of the amplifier 21 a ramp or sawtooth voltage similar to that shown in FIG. 2. The voltage ramps up in steps at a rate dependent on the clock-pulse rate. The steps or serrations are easily seen in FIG. 2 (the magnitude of the steps being exaggerated in FIG. 2 for purposes of illustration). The voltage continues to ramp up until the output from the up-down counter 17 equals the input to the digital comparator 16 representative of desired speed. When this condition occurs, the counter 17 receives a command to stop counting; and the ramp levels to a steady state voltage as seen in FIG. 2.

The time interval of the ramp-up voltage and its average slope remain constant once it is determined for a particular system. This is due to the stability and lack of drift problems provided by the arrangement of the present invention.

The ramp voltage rate can be easily changed by changing the clock frequency with a resultant change in ramp voltage time interval and slope. This is useful for factory adjustment of the ramp voltage rate, e.g., calibration for different capstan control systems or in the field if system parameters are changed.

The ramp voltage is continuously applied as an analog voltage to summing junction $J_0$ where it is combined with the voltage of the tachometer generator 13 which is proportional to the instantaneous speed of the motor 10. The tachometer voltage which is always opposite in polarity to the ramp voltage, follows the slope of the ramp voltage in a lagging manner; and the motor 10 runs on the difference in voltage applied to the motor via high-gain amplifier 22. During ramp up the tachometer voltage is less than the ramp voltage until motor speed reaches the desired value which is when the time counter 17 stops counting. At this time the motor 10 has reached desired running speed, and the voltages at summing junction $J_0$ ideally cancel each other out. However, in actual practice, this condition never occurs; and the tachometer voltage constantly hovers about the running speed voltage due to minute decelerations and accelerations of the motor 10. This causes minute corrections in the running speed of the motor 10 since such changes in tachometer voltage provide minute voltage differences on which the motor 10 runs.

During ramp up, i.e., during the time motor 10 is being driven up to running speed the tachometer voltage follows the ramp voltage; and the motor 10 accelerates on the difference between the two voltages. Since it is well known that any motor is basically an integrator and would constantly accelerate on a constant voltage, it is desirable for accurate control purposes to utilize the tachometer-feedback voltage. Thus, during ramp up and ramp down, the motor runs on the difference in voltage between the ramp voltages. In addition, when the motor achieves desired speed, the motor runs on the minute differences in voltages between the leveled-out ramp voltage which is a constant voltage and the changes in tachometer voltage produced by slight variations of the motor speed about the desired speed.

FIG. 3 illustrates waveforms representative of the ramp-up voltage, the constant voltage and the ramp-down voltage provided at the summing junction $J_0$ from the digital-to-analog converter 20 for the conditions of driving the motor 10 from stop to desired running speed, at desired running speed, and bringing the motor from desired running speed to stop, respectively.

The dotted line represents the tachometer voltage which is proportional to the instantaneous velocity of the motor 10. The tachometer voltage, while shown positive for convenience has a polarity opposite to that voltage provided from the digital-to-analog converter 20. During ramp up and down, the times during which the motor 10 is driven up to running speed from stop and from running speed to stop, the tachometer voltage follows the ramp voltage; and the motor 10 runs on the difference, i.e., +dv. during ramp up and −dv. during ramp down, which is effectively a braking voltage.

When the motor 10 has been driven up to running speed (when the counter 17 has stopped counting), the voltage from the digital-to-analog converter immediately levels off to a constant value. At this time, i.e., when the motor is up to speed, the tachometer voltage is equal and opposite so that ideally the voltage at summing junction $J_0$ is zero. In actual practice, however, since at zero voltage the motor 10 is receiving no drive voltage, it starts to slow down. When this happens, the tachometer voltage becomes less than the constant voltage producing a minute difference in voltage by which the motor 10 is speeded up. This occurs continuously, and, therefore, the motor continuously runs at a constant speed. These changes are shown by the curved dotted line in FIG. 3. It should be noted that these changes are extremely minute and in FIG. 3 are greatly exaggerated for ease of showing.

The tachometer voltage may also during running speed exceed the constant voltage by a minute amount, causing the motor to be slowed down.

When the motor 10 is being driven at the desired running speed and the code generator 15 receives a command to stop the motor 10, an eight-bit code representative of this stopped condition is provided digital comparator 16; and since the output from the up-down counter 17 is greater, the counter 17 begins to count down producing a ramp voltage in the down direction until the digitally-coded inputs to digital comparator 16 becomes equal. The counter then stops counting providing a zero voltage at summing junction $J_0$. During ramp down the motor slows down until the ramp voltage equals zero, at which time it stops. During this ramp-down condition, the tachometer voltage follows the ramp down as seen in FIG. 3. During this ramp-down time the motor 10 is effectively being braked by the voltage difference −dv. and stops when −dv. equals zero.

The present invention operates substantially in the same fashion during high-speed conditions, e.g., during rewind, except that the command causes the code generator 15 to provide a digital output indicative of a speed higher than normal read-write running speed.

Normal running speed or high-speed running in the reverse direction is accomplished in exactly the same way as forward running, except that certain bits from the code generator 15 command running in the opposite direction.

When the motor 10 is driving the capstan 11 in one direction, it is possible that the code generator 15 will receive a command to cause the motor 10 to reverse direction and run in the opposite direction at a selected speed. In this case the motor 10 is ramped down to a stop and from a stop ramped up to running speed in the opposite direction. As should be obvious, the same techniques for ramping up and ramping down are employed and need not be re-explained here.

It should be obvious no writing or reading takes place during the time interval that the motor 10 is ramping up to normal speed or ramping down to stop, but only during the time the motor is driving the magnetic tape past the read-write head at normal read-write speed. Due to precise speed control of the capstan 11 without drift or speed overshoot which both contribute to variance in the ramp-up and ramp-down time intervals, these time intervals are kept constant and without change in ramp slope. Thus, the ramp-time interval is precisely known and deviations are minimized. This permits accurate tape formatting since tape inter-data gaps can, in addition to being shorter, be precisely known with all speed changes taking place within these gaps without making the gaps longer to accomodate deviations in speed-changing times.

Other modifications of the present invention are possible in the light of the above description, and no limitations should be placed on the invention other than those set forth in the following claims.

What is claimed is:

1. A tape-transport system having a capstan for transporting tape past a read-write head, comprising in combination:

a motor connected to the capstan for driving the capstan in a first or second direction;

control means providing speed and direction command signals;

generator means connected to the output of said control means and responsive to said speed and direction commands from said control means to provide a digital output indicative of the desired speed and direction of the capstan;

a digital comparator connected at one input to the output of said generator means for receiving said digital output therefrom;

an up-down counter;

a clock-pulse source connected to said up-down counter to cause said up-down counter to count in synchronism with the occurrence of clock pulses from said source;

a digital-to-analog converter connected to the output of said up-down counter for continuously converting the output count of said counter to an analog voltage;

conductor means coupling the output of said counter back to another input of said digital comparator;

said digital comparator for comparing the digital outputs from said generator means and said counter and connected at an output to said counter for providing a signal to cause said counter to change its count until its digital count equals the digital output from said generator means;

tachometer generator means connected to said motor for providing an output voltage proportional to the instantaneous velocity of said motor and having a polarity opposite to that of said analog voltage; and summing junction means connected to said converter and said tachometer generator means for summing the output voltages therefrom and connected to said motor whereby said motor receives a drive voltage only when the tachometer voltage and said analog voltage differ in amplitude.

* * * * *